March 31, 1936.  R. O. BEARDSLEY ET AL  2,035,780
COMPARATOR
Filed Oct. 6, 1934   4 Sheets-Sheet 1
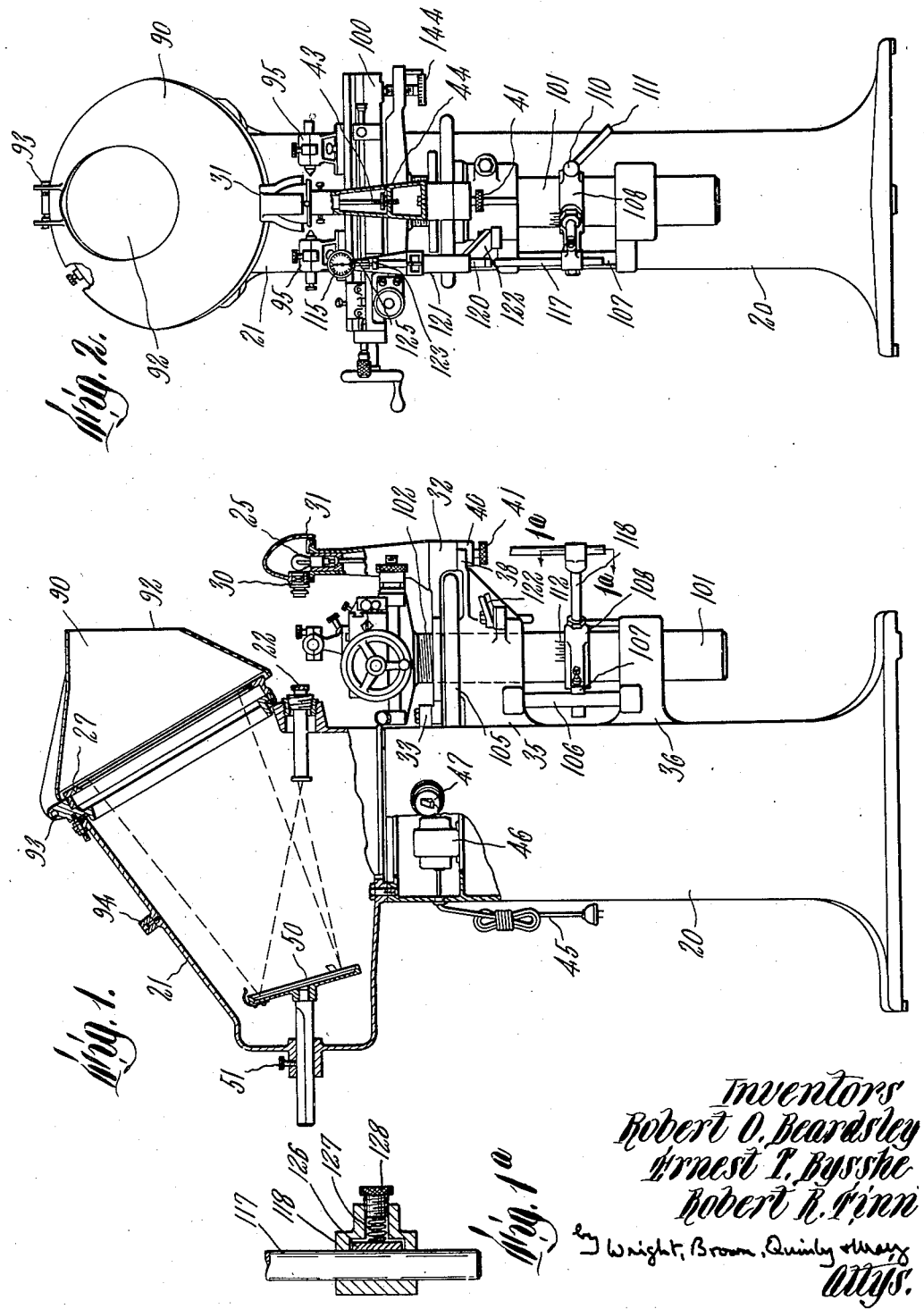

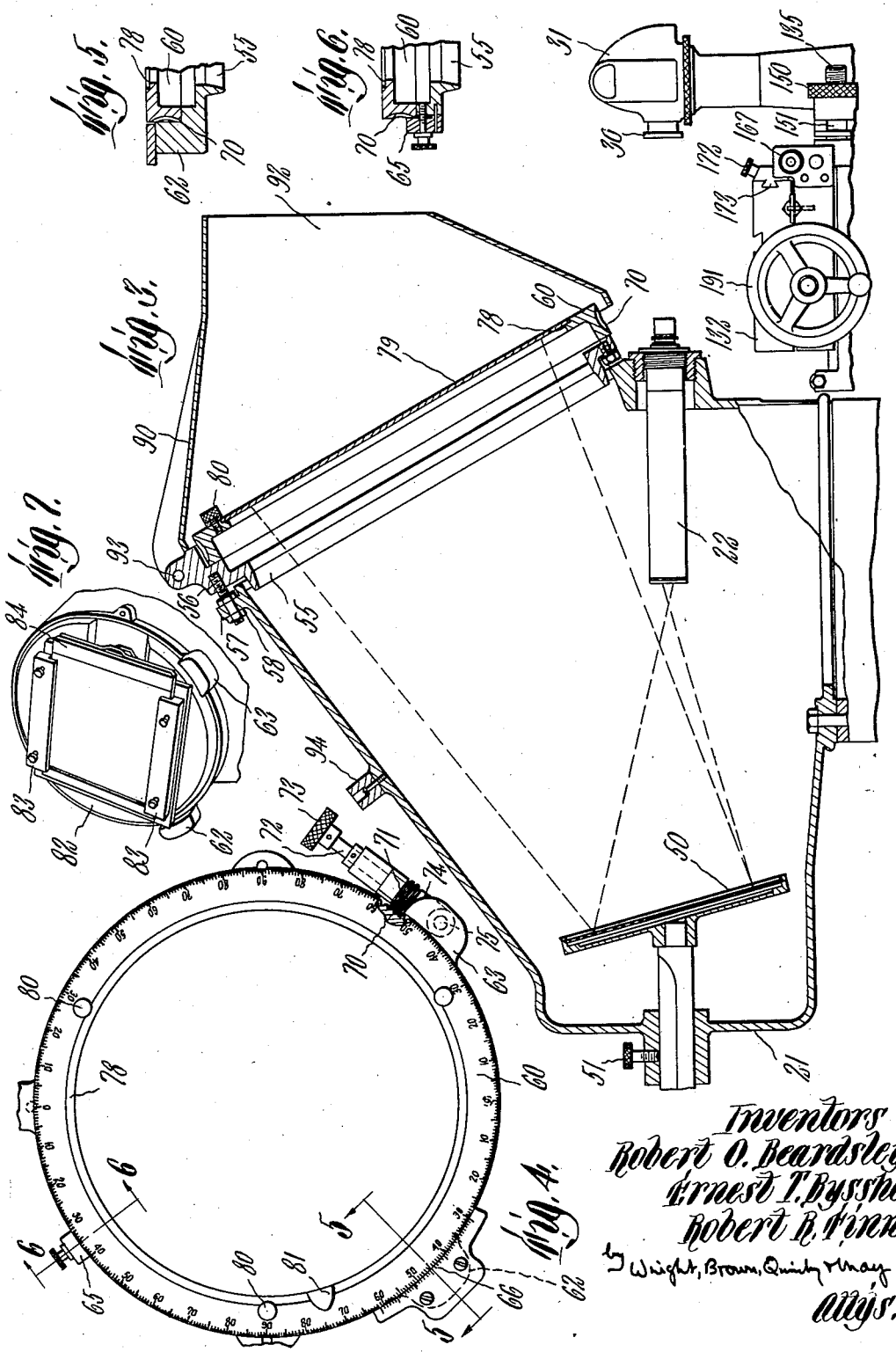

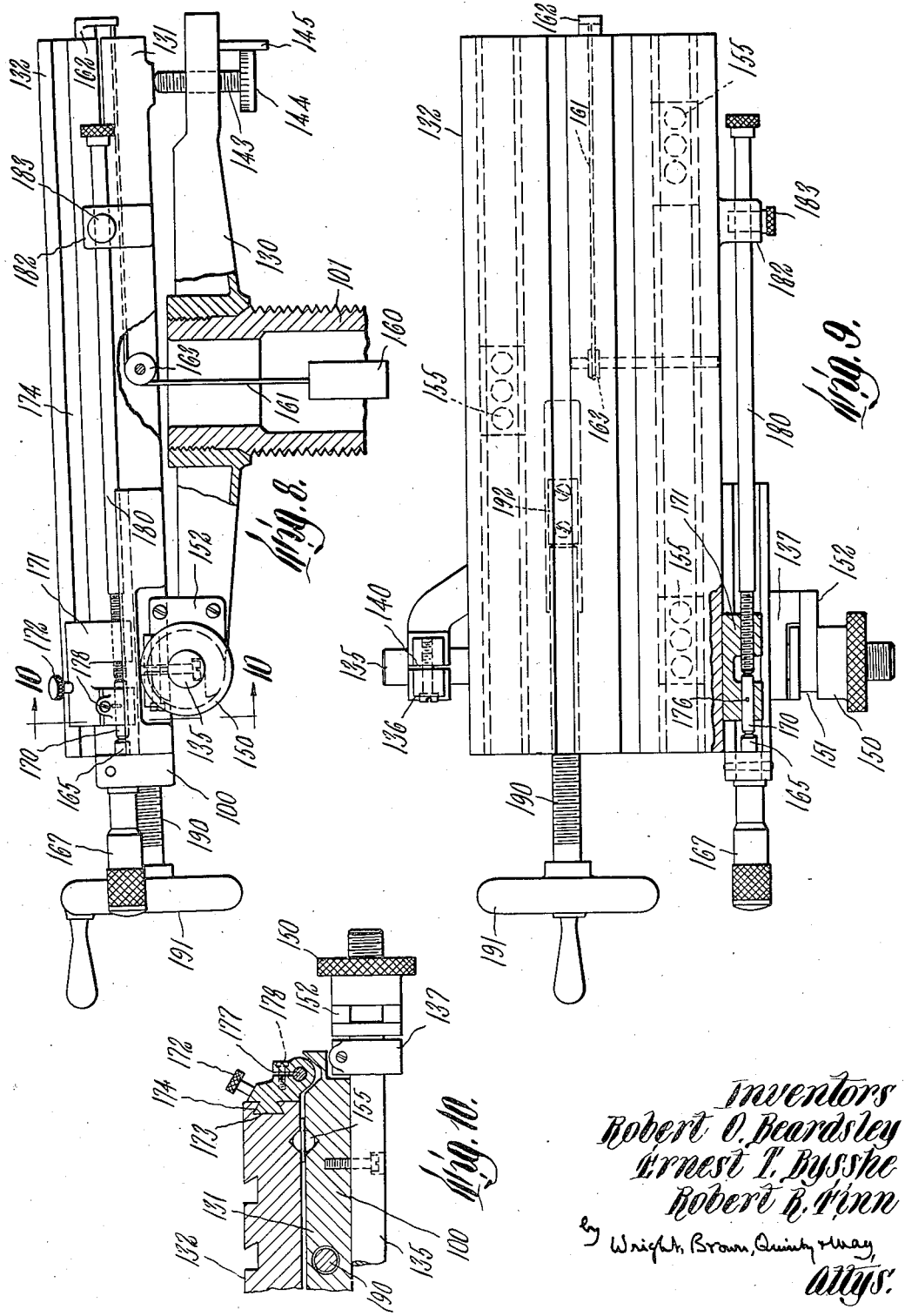

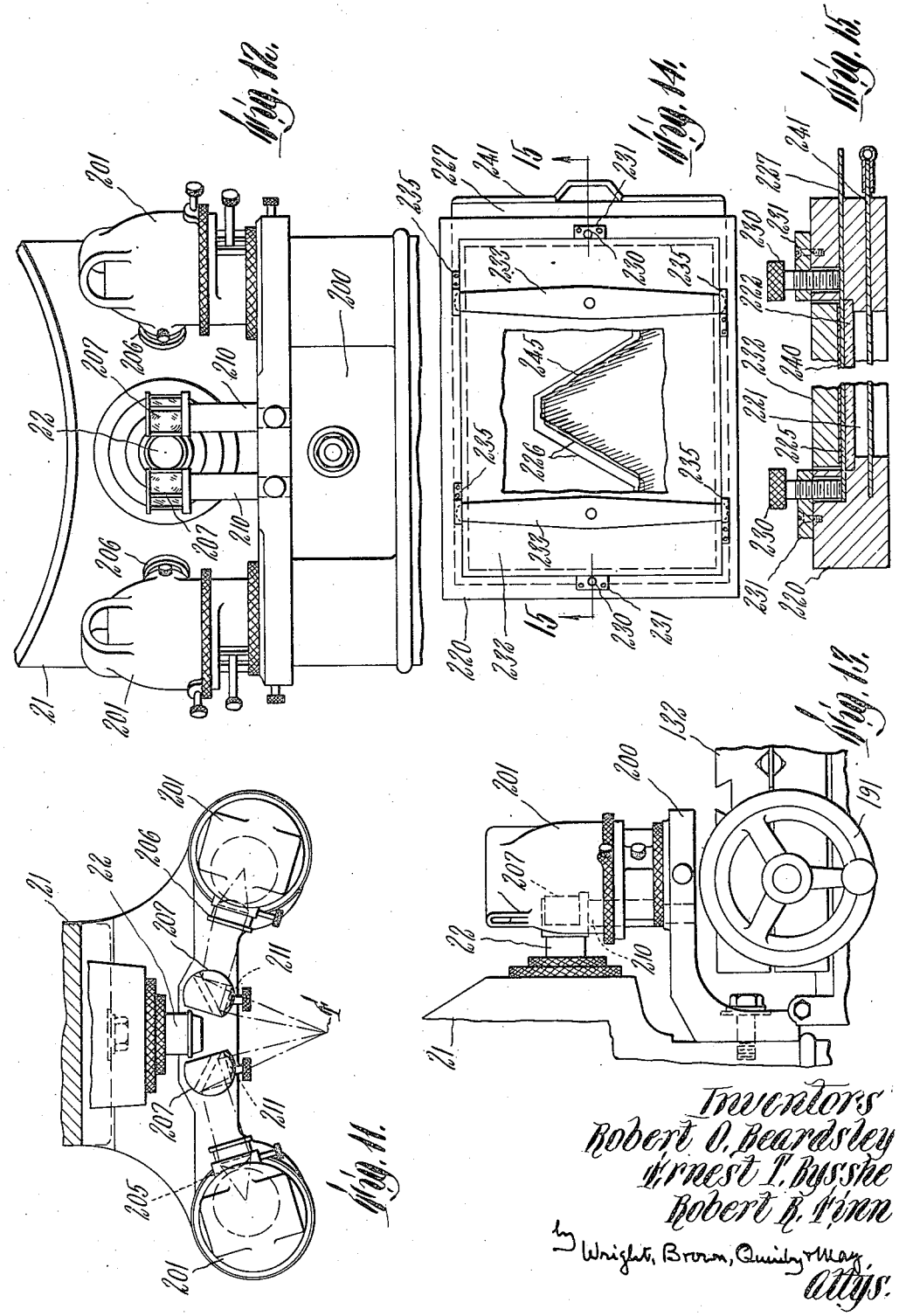

Patented Mar. 31, 1936

2,035,780

UNITED STATES PATENT OFFICE 2,035,780

COMPARATOR

Robert O. Beardsley, Ernest T. Bysshe, and Robert R. Finn, Springfield, Vt., assignors to Jones & Lamson Machine Company, Springfield, Vt., a corporation of Vermont Application October 6, 1934, Serial No. 747,200

16 Claims. (Cl. 88—24)

This invention relates to improvements in optical comparators of the kind described in the Hartness and Porter Patent No. 1,703,933, issued March 5, 1929.

It is an object of the invention to provide a comparator which is adapted to test objects of various kinds such as screw threads, gear teeth, and other articles having contours which should be accurate within defined limits of error.

For a more complete understanding of the invention, reference may be had to the description thereof which follows and to the drawings, of which Figure 1 is a side elevation of a comparator embodying the invention, portions being broken away to show the interior parts of the apparatus.

Figure 1a is a section on the line 1a—1a of Figure 1.

Figure 2 is a front elevation of the same, a portion of the lamp house being broken away.

Figure 3 is a side elevation of the upper portion of the apparatus shown in Figure 1, on a larger scale.

Figure 4 is a plan view of the chart holder and means for rotationally adjusting the same.

Figure 5 is a fragmentary section on the line 5—5 of Figure 4.

Figure 6 is a fragmentary section on the line 6—6 of Figure 4.

Figure 7 is a perspective view of a portion of the comparator casing showing a photographic plate holder adapter.

Figure 8 is a front elevation of the table supporting an object to be tested.

Figure 9 is a plan view of the same.

Figure 10 is a section taken on the line 10—10 of Figure 8.

Figure 11 is a plan view of a portion of the comparator showing apparatus for direct illumination instead of shadow illumination.

Figure 12 is a front elevation of the same.

Figure 13 is a side elevation of the same.

Figure 14 is a plan view of a special holder for a chart and photographic plate, a portion being broken away.

Figure 15 is a section on the line 15—15 of Figure 14.

As illustrated in Figures 1 and 2, the comparator includes a vertical pillar or standard 20 on the upper end of which is mounted a hollow casing 21. In the front wall of the casing is mounted a lens system 22 adapted to receive light beams projected from a lamp 25 past an object mounted between the lamp and the lens system, and to cast a sharp shadow image of the object on a chart mounted in a chart holder 27. The light from the lamp 25 is projected through a condensing lens 30 which is in line with the lens system 22. The lamp may be mounted in a suitable lamp house 31 which in turn is supported on a bracket 32 projecting out from a lug 33 on the standard 20, to which it is pivotally attached. Thus the lamp house is adapted to swing about a pivot directly under the lens system 22.

Projecting laterally from the standard 20 are a pair of fixed brackets 35 and 36. The upper bracket 35 is provided at its outer end with an arcuate lip 38 on which slides the outer end portion of the bracket 32. From the bracket 32 a small bracket 40 extends down under the lip 38 and supports a set-screw 41 by which the bracket 32 with the lamp house 31 can be clamped in adjusted position with reference to the pivot 33. The socket for the lamp 25 is mounted on a vertical stem 43 which is threaded at its lower end and is vertically adjustable by a nut 44, as indicated in Figure 2. The current for the lamp may be supplied through a suitable wire 48 which may be connected to a lighting system, the voltage being reduced through a transformer 46, if necessary. The lamp is turned on and off as by a switch 47.

Within the casing 21 is a suitable mirror 50 which is adjustably supported, being fixed in position as by a set-screw 51. This mirror reflects the rays of light from the lens system 22 and directs them to a chart or photographic plate held over the aperture at the upper end of the casing. In this aperture is fitted a ring-shaped frame member 55 provided with a suitable number of threaded studs 56 which pass through lugs 57 on the casing, nuts 58 being provided for adjustment of the position of the frame member 55. A ring-shaped chart holder 60 is adapted to be mounted on the frame member 55. In order to retain the chart holder 60 in position, the frame member 55 is provided with a pair of upstanding lugs 62 and 63 against which the periphery of the chart holder may rest by gravity. In order to clamp the chart holder in position, a clamping device 65 may be provided as shown in Figure 6. The upper face of the chart holder 60 is preferably graduated in degrees of arc, as indicated in Figure 4. Cooperating with these graduations is a vernier scale member 66 on the upper face of the lug 62. Thus a chart may be rotated through any desired angle so as to make reference marks on the chart to coincide successively with different portions of a shadow outline cast upon the chart, the angle of such rotative adjustment being accurately observable to fractions of a degree. For slow-motion, rotative adjustment of the chart holder 60, the peripheral edge of the chart holder may be provided with suitable gear teeth 70, the series of these teeth preferably extending around the entire circumference of the chart holder. As indicated in Figure 4, a worm 71 is adapted to mesh with these teeth, the worm being mounted on a rotatable shaft 72 operable by a knurled head 73. The shaft and worm are carried by a member 74 which is hinged to the lug 63 as at 75 so that the worm 71 can be swung clear of the teeth 70 to permit rapid angular adjustment of the chart holder 60. The upper face of the chart holder is provided with an annular shoulder 78 adapted to support the edges of a circular chart 79, the chart being held in place by overlapping portions of a suitable number of set-screws 80. A suitable shallow groove 81 may be provided in the face of the chart holder to facilitate the removal of a chart from its position on the holder.

If a permanent record of a shadow outline is desired, the chart holder 60 may be removed from the frame member 55 and may be replaced by an adapter 82 which has a rectangular opening corresponding to the size of a photographic plate. Mounted on the adapter 82 are a pair of guide pieces 83 adapted to receive a photographic plate holder 84 which may be of ordinary construction as indicated in Figure 7, or may be specially constructed as illustrated in Figures 14 and 15 and hereinafter described. The adapter 82, instead of displacing the chart holder 60, may be made to fit on the chart holder in place of the circular chart 79.

When shadow images are being observed on a chart, it is desirable that the chart be shielded as far as possible from stray light which may come from various directions in the room in which the comparator is set up. To shield the chart from access of such light without interfering with easy observation, a hood 90 is provided. As shown, this hood may be of frusto-conical shape, having a circular base fitting on the upper face of the frame 55. The cone of the hood 90 is cut off on a sloping plane as indicated in Figures 1 and 3 so as to leave an aperture 92 smaller than the aperture surrounded by the frame 55. The hood 90 is hinged as at 93 to the uppermost point of the frame 55 so that it can be swung upward and backward to rest against a suitable lug 94 on the casing 21 when it is desired to get the hood out of the way for manipulation of the chart or for installation of the photographic plate holder.

The object to be tested must be mounted in the beam of light extending from the condensing lens 30 to the lens system 22. To this end, the object may be mounted in a suitable cradle or between adjustable gripping elements 95, mounted on a table 100. This table may be constructed in various ways, one specific structure being hereinafter described in detail. For vertical adjustment, the table is mounted on the upper end of a spindle or ram 101, this ram being slidable vertically through alined bores in the brackets 35 and 36. The upper portion of the ram is screw-threaded as at 102, this thread being engaged by a hand wheel 105 which is horizontally disposed and which is rotatably supported on the upper face of the bracket 35. In order to facilitate operation of the hand wheel 105, suitable anti-friction bearings may be employed between the wheel and the supporting bracket. The ram 101 is held against rotation by suitable means such as a vertical guide 106 and a guide follower 107 which is clamped to the ram as by a split collar 108. The ends of the split collar are drawn together by a suitable screw 110 operated by a convenient handle 111. By slacking off on the screw 110, the ram 101 and table 100 may be angularly adjusted about the vertical axis of the ram. The angle of such adjustment may be indicated as by scale marks 112 on the ram adjacent to the collar 108, the collar preferably having an index mark to cooperate with the scale marks 112. The amount of vertical adjustment of the table 100 may be indicated on a suitable micrometer dial 115. For this purpose, a vertical rod 117 is adjustably supported by a bracket 118 extending outwardly from the split collar 108 so that the rod 117 moves up and down with the ram and table. An extension 120 of the rod 117 passes loosely through a fixed guide member 121 supported by a bracket 122 which in turn is mounted on the bracket 35. The micrometer 115 is mounted on the guide member 121. The extension 120, which passes up through the guide member 121, terminates in a head or anvil 123 which is adapted to abut a plunger 125 of the micrometer 115. Since the micrometer is fixed and the rod extension 120 moves vertically with the ram 101, the micrometer thus indicates the extent of such vertical movement. The upper face of the anvil 123 is accurately finished so that measuring blocks may be placed thereon. In order to avoid possible injury to this portion of the apparatus in case the table is given too great a vertical shift, the rod 117 may be frictionally held in the bracket 118 as indicated in Figure 1a. To this end, the bracket carries a shoe 126 which is resiliently pressed against the rod 117 as by a spring 127 and screw 128. This permits the rod 117 to yield vertically if the table is shifted too far.

As indicated in Figures 8, 9, and 10, the table 100 may be constructed with various adjustments. To this end, it is shown as comprising three superimposed parts, a horizontal frame 130 fixed to the upper end of the ram 101, a plate 131 hinged at one end to the frame 130, and a platform member 132 slidable on the plate 131 in a direction transverse with respect to the beam of light cast by the lamp 25. To the plate 131 is secured a shaft 135 which is adapted to rock in a pair of bearings 136 and 137. These bearings are preferably split as at 140 so that the bearings may be clamped tightly on the shaft 135 to prevent rocking thereof when it is desired to hold the plate 131 at a fixed angle relative to the frame 130. In order to incline or tilt the plate 131 and the table 132 thereon, a suitable adjusting screw 143 may be threaded through the frame 130 adjacent to the end opposite from the shaft 135. The screw 143 may have a head 144 which is graduated to cooperate with an index piece 145 so as to indicate the amount of tilt. The plate 131 is also slidably adjustable with the shaft 135 in the direction of the axis of the shaft. For such sliding adjustment a finger nut 150 is threaded on an end portion of the shaft 135, this nut having an annular recess 151 which receives a fork 152 mounted on the frame 130. Thus, when the nut 150 is rotated, the shaft 135 and the plate 131 are shifted in such a manner as to move an object mounted on the table toward or from the lens system 22. This adjustment is useful in focusing the shadow of the object on the chart so that it will have a sharp outline. The slide or platform 132 is movable endwise on the plate 131, roller bearings 155 being preferably provided to facilitate such movement. In order to avoid back-lash or slack between the plate 131 and the slide 132 when the latter is shifted longitudinally from one position to another, means is provided for constantly pressing the slide in one direction, that is, toward the left as shown in Figures 8 and 9. To this end, a suitable weight 160 may be suspended in the hollow interior of the column 101 by a flexible strand 161, the end of the strand being attached to an anchor member 162 attached to the end of the slide 132, this strand passing over a suitable sheave 163 mounted on the plate 131. Cooperating with the weight 160 is a suitable stop member 165, this member being preferably the spindle of a micrometer device 167 mounted on the plate 131. Abutting the end of the spindle 165 is an abutment member 170 which is carried by a carriage 171, this carriage being adjustably clamped to the platform 132 as by a set-screw 172 which clamps a dove-tail member 173 in a dove-tail groove 174. The abutment member 170 is preferably provided with a laterally projecting pin 176 which rides in a slot 177 to prevent rotation of the member 170. A set-screw 178 is provided to clamp the member 170 so that it can be made immovable with respect to the carriage 171. Alined with the abutment member 170 is an adjusting screw 180 having a portion in threaded engagement with the carriage 171. The shank of the screw 180 passes loosely through a lug 182 containing a set-screw 183 by which the screw 180 may be tightly clamped by the lug. The lug is mounted on the slide 131. In using the table for a comparison of different parts of an object, the micrometer 167 may be adjusted to its zero mark, and then the screw 180 may be rotated so as to move the table endwise until the desired portion of the shadow outline coincides with a reference mark on the chart. The abutment member 170 may then be clamped in place by setting up on the screw 178. The platform 132 is then moved to the right a sufficient distance for the insertion of a spacing piece (not shown) of standard length between the ends of the spindle 165 and the abutment member 170. The table is then released to permit the abutment member 170 to press the spacing piece against the end of the spindle 165. The shadow image can then be compared with the reference lines on the chart. For convenience in shifting the table to the right, a screw 190 may be mounted in the left-hand end of the plate 131, this screw having a hand wheel 191 at the outer end thereof, the inner end thereof bearing against an abutment member 192 mounted on the slide 132. By rotating the hand wheel 191, the platform 132 may be readily shifted toward the right or allowed to return toward the left under the influence of the weight 160.

If an illuminated image is desired on the screen instead of a shadow image, an illuminating device may be provided such as that illustrated in Figures 11 to 13. As therein shown, a bracket 200 may be bolted to the front wall of the housing 21. On this bracket a pair of lamp houses 201 are secured, these houses being rotatively adjustable about a vertical axis. Each house contains an electric lamp, the position of which can be adjusted by suitable mechanism, and a plano-convex lens 205 in a holder 206 which is adjustable toward and from the lamp for focusing purposes. The light from each lens 206 is reflected by a suitable mirror such as a prism 207 so that the rays focus at a point F at or near which the object to be illuminated is located. The prisms 207 may be supported on suitable standards 210. Each prism may, if desired, have a plano-convex lens 211 associated therewith to supplement the action of the lenses 205 in concentrating the rays from the lamps. The various adjustments of the lamps, lamp houses, and prisms, as well as of the table 100 on which the object is mounted, make it possible to illuminate the object in the best manner for the projection of a satisfactory image on the screen.

Figures 14 and 15 illustrate a combined chart and plate holder adapted to produce a combined photographic image of the outline of an object to be tested and a chart diagram. As illustrated, the holder may comprise a frame 220 adapted to occupy the position of the frame 84 shown in Figure 7. The rectangular opening 221 in the frame 220 may be provided with a glass pane 222 to furnish a stiff support against which a chart and photographic film may be pressed. Overlying the pane 222 is a translucent chart 225. On the chart may be any desired lines of reference such as, for example, tolerance outlines 226 for a screw thread, as illustrated in Figure 14. The chart 225 may be inserted in the frame 220 edge-wise through a narrow slot in the end of the frame, the chart being preferably long enough to have a projecting end portion 227 which can be grasped to adjust the position of the chart in the frame. To clamp the chart in adjusted position, a pair of set screws 230 may be mounted in brackets 231 so as to press down on the chart and prevent it from slipping from its adjusted position. The frame is provided with the usual back 232 having a pair of pivoted springs 233 adapted to catch under a set of lugs 235 on the frame to hold the back 232 releasably in position and to press it resiliently against the pane 222. A photographic plate or film 240 is adapted to be inserted between the chart 225 and the back 232, an opaque slide 241 being insertable on the frame below the pane 222 to protect the film 240 from light. In using the frame, the back 232 and the slide 241 are removed, and the frame is positioned on the cover plate 82. A chart 225 is inserted in the frame and is adjusted properly with reference to the shadow image of an object to be tested, such an image being illustrated at 245 in Figure 14. The chart 225 is clamped in adjusted position by setting up on the screws 230, and the whole frame is removed to a darkroom where a sensitized photographic film 240 is inserted with the back 232 to press it firmly against the film 225, and the slide 241 is inserted. The frame is then replaced in position on the cover plate 82 whereupon the slide 241 can be removed for a sufficient period to expose the film 225 to light rays entering the casing through the lens system 22. Thus a permanent photographic record may be made of the superposed outlines of the chart diagram and the shadow image.

We claim:—

1. In an optical comparator, means for forming a shadow image of the object to be tested, including means for projecting a horizontal beam of light, and a lens system in line with said beam and spaced from said projecting means, in combination with a table for supporting an object to be tested between said projecting means and said lens system, a vertical ram extending downward from said table, a fixed guide parallel to said ram, means engaging said guide and releasably clamped to said ram to prevent rotation thereof, means for vertically adjusting said ram and table, and a vertical standard supporting all said means.

2. An optical comparator comprising a standard, a bracket projecting laterally therefrom, a horizontal wheel having a screw-threaded central aperture rotatably supported on said bracket, a vertical ram extending through said wheel and in threaded engagement therewith for vertical adjustment by rotation of said wheel, a table mounted on the upper end of said ram to support shadow-casting objects to be tested, means for preventing rotation of said ram and table consisting of a vertical guide member carried by said standard and a follower releasably clamped to said ram and in sliding engagement with said guide, and means carried by said standard for forming a magnified shadow image of a portion of an object supported on said table.

3. An optical comparator comprising a standard, a casing mounted thereon, a lens system and screen supported by said casing, means for projecting a beam of light through said lens system and onto said screen, and means for supporting an object to be tested in position to cast a magnified shadow on said screen, said supporting means including a pair of brackets projecting laterally from said standard and having vertically alined bores, a ram movable vertically in said bores, a wheel in threaded engagement with a portion of said ram supported on one of said brackets and rotatable to adjust said ram vertically, a table mounted on the upper end of said ram to support an object to be tested, a fixed vertical guide carried by said standard, a guide-follower clamped to said ram and engaging said guide to prevent rotative movement by said ram, said guide-follower being releasable to permit rotative adjustment of said ram and the table thereon about a vertical axis, and means on said ram and follower for indicating the angle of rotative adjustment of said ram and table.

4. In an optical comparator, means for adjustably supporting an object to be tested, said means comprising a table, a fixed support, a vertically adjustable movable support carried by said fixed support, said table being mounted on said movable support, and means for indicating the extent of vertical adjustment of said movable support and table, said indicating means including a micrometer device mounted on said fixed support, a vertically movable anvil mounted below said micrometer device for operative engagement therewith, and means operatively and adjustably connecting said anvil with said movable support whereby said anvil moves vertically with said movable support.

5. In an optical comparator, means for adjustably supporting an object to be tested, said means comprising a fixed support, a vertically adjustable movable support carried by said fixed support, a table mounted on said movable support, and means for indicating the extent of vertical adjustment of said movable support and table, said indicating means including a fixed micrometer device, a contact element carried by said movable support and vertically adjustable relatively thereto for engagement with said micrometer device, and frictional means connecting said contact element with said movable support whereby said contact element can yield vertically to avoid excessive pressure against said micrometer device.

6. In an optical comparator, means for adjustably supporting an object to be tested, said means comprising a vertical standard, brackets projecting laterally therefrom, a vertical ram passing through said brackets, a table mounted on the upper end of said ram, means for adjusting said ram and table vertically, means for preventing rotation of said ram and table, and means for indicating the extent of vertical movement of said ram and table, said indicating means including a vertical guide member rigidly supported on one of said brackets, a micrometer device mounted on said guide member, and a vertically adjustable anvil secured to said ram, said anvil having a contact portion extending through said vertical guide for operative engagement with said micrometer device.

7. In an optical comparator, means for supporting an object to be tested, said means comprising a vertical ram, a horizontal frame fixed to the upper end of said ram, a horizontal plate hinged at one end to said frame, a platform slidable on said plate, means for adjustably tilting said plate and platform, means tending to move said platform in one direction, an adjustable stop opposing movement of said platform in said direction, and means for supporting and vertically adjusting said ram.

8. In an optical comparator, means for projecting a beam of light to cast a shadow of an object to be tested, means for supporting said object to be tested, said supporting means comprising a horizontal plate, a platform slidable on said plate in a direction transverse with respect to said light beam, means constantly pressing said platform in said direction, an abutment member carried by said platform and adjustable in the direction of movement of said platform, and a stop element having a micrometer adjustment engaged by said abutment member to determine the position of horizontal adjustment of said platform.

9. In an optical comparator, means for supporting an object to be tested, said means comprising a horizontal frame, means for adjusting said frame vertically, a plate overlying said frame and hinged thereto at one end, means for adjustably tilting the hinged plate relatively to said frame, means for adjustably shifting said plate edgewise in the direction of the axis of the hinge, a platform overlying said plate and slidable thereon in a direction transverse with respect to the axis of said hinge, an adjustable stop on said plate engaged by said platform, and means constantly pressing said platform against said stop.

10. An optical comparator comprising a standard, a casing on said standard, a screen and a lens system carried by said casing, a table adjustably supported by said standard, and means for illuminating an object mounted on said table, said means including a bracket on said standard, a pair of lamp houses on said bracket on opposite sides of the optical axis of said lens system, lamps in said houses, a pair of reflectors arranged to reflect light from said lamps on an object supported on said table between said lamp houses in line with said lens system, and condensing lenses adjustable to focus light from lamps in said lamp houses on said object.

11. An optical comparator comprising a casing having an aperture, a support for said casing, a ring-shaped frame member adjustably secured to said casing and surrounding said aperture, a ring-shaped chart holder rotatable on said frame member about its center, slow motion means for rotatably adjusting said chart holder, and means carried by said support for casting a shadow outline of an object to be tested on a chart held by said chart holder.

12. An optical comparator comprising a casing having an aperture, a support for said casing, a ring-shaped frame member adjustably mounted on said casing around said aperture, a ring-shaped graduated chart holder rotatable on said frame member about its center, said chart holder having gear teeth in its outer periphery, a manually operable worm movable into and out of meshing engagement with said teeth, said worm being actuable when meshing said teeth to impart slow rotational movement to said chart holder, and means carried by said support for casting on said chart an image of an object to be tested.

13. In an optical comparator, a casing having an aperture, a ring-shaped frame member adjustably mounted on said casing and surrounding said aperture, a ring-shaped chart holder rotatable on said member about its center, radial scale marks on said chart holder, a vernier scale mounted on said member adjacent to a portion of said chart holder, slow-motion means for rotatably adjusting said chart holder for vernier reading, and means for casting on a chart mounted in said chart holder an image of an object to be tested.

14. An optical comparator comprising a casing having an aperture, a support for said casing, a ring-shaped frame member adjustably mounted on said casing around said aperture, a circular plate having a rectangular opening fitted in said frame, means on said plate for receiving and holding in registry with said opening a photographic plate holder, and means carried by said support for casting on a photographic plate held over said opening an image of an object to be tested.

15. In an optical comparator, a casing having a rectangular aperture, a frame adapted to fit over said aperture, means for releasably holding said frame in a predetermined position over said aperture, a translucent chart in said frame adjustable in its own plane, means on said frame for holding said chart in adjusted position, means in said frame for holding a photographic plate or film against said chart, and means for casting on said chart on image of an object to be tested.

16. An optical comparator comprising a casing having an aperture, a support for said casing, a ring-shaped frame adjustably mounted on said casing around said aperture, means on said frame for holding a translucent screen across said aperture, a hood hinged to said frame at its uppermost point, said hood having a frusto-conical shape with a circular base fitting against said frame and an opening at its upper end smaller than said aperture, and means carried by said support for casting on a screen held across said aperture an image of an object to be tested.

ROBERT O. BEARDSLEY.
ERNEST T. BYSSHE.
ROBERT R. FINN.